United States Patent [19]

Specht

[11] Patent Number: 4,756,979
[45] Date of Patent: Jul. 12, 1988

[54] POWER GENERATION SYSTEMS AND METHODS

[75] Inventor: Steven J. Specht, Mentor, Ohio

[73] Assignee: Gould Inc., Rolling Meadows, Ill.

[21] Appl. No.: 875,593

[22] Filed: Jun. 18, 1986

Related U.S. Application Data

[63] Continuation-in-part of Ser. No. 831,811, Feb. 21, 1986, Pat. No. 4,677,040.

[51] Int. Cl.$^4$ .................... H01M 10/36; H01M 12/04
[52] U.S. Cl. ........................................ 429/15; 429/17; 429/19; 429/51; 429/101
[58] Field of Search ................... 429/101, 105, 51, 70

[56] References Cited

U.S. PATENT DOCUMENTS

| | | | |
|---|---|---|---|
| 3,791,871 | 2/1974 | Rowley | 136/100 |
| 3,976,509 | 8/1976 | Tsai et al. | 136/154 |
| 4,084,038 | 4/1978 | Scragg et al. | 429/19 |
| 4,349,613 | 9/1982 | Winsel | 429/17 |
| 4,528,248 | 7/1985 | Galbraith | 429/8 |

FOREIGN PATENT DOCUMENTS 51-77831 7/1976 Japan.
56-39028 9/1981 Japan.

OTHER PUBLICATIONS

"Development of a Lithium-Water-Air Primary Battery", by W. R. Momyer et al., American Institute of Aeronautics and Astronautics, Inc., 1980.
Cooper, J. F. et al, "Lithium Requirements for Electric Vehicles using Lithium-Water-Air Batteries", Symposium on United States Lithium Resources—Requirements by the Year 2000, Nov. 12, 1975.

Primary Examiner—Donald L. Walton
Attorney, Agent, or Firm—Marshall, O'Toole, Gerstein, Murray & Bicknell

[57] ABSTRACT

A power generation system utilizing an electrochemical cell comprising a consumable metal anode, a cathode spaced from the anode to define an electrochemical reaction zone therebetween and an electrolyte comprising an aqueous solution of the hydroxide of the consumable metal is disclosed. The electrolyte is circulated through the reaction zone to electrochemically generate electrical power and to form the hydroxide of the consumable metal. The hydroxide of the consumable metal is converted to water and at least one oxide of the consumable metal. The water is separated from the consumable metal oxide and is added to the electrolyte. The invention also comprehends corresponding methods of power generation.

44 Claims, 4 Drawing Sheets

POWER GENERATION SYSTEMS AND METHODS

CROSS-REFERENCE TO RELATED APPLICATION

This application is a continuation-in-part of copending, commonly assigned application Ser. No. 831,811 filed Feb. 21, 1986, now U.S. Pat. No. 4,677,040 issued Oct. 30, 1987.

BACKGROUND OF THE INVENTION

1. Field of the Invention

This invention relates generally to power generation systems and, more particularly, this invention relates to power generation systems utilizing electrochemical cells and methods for improving performance therein.

2. Description of the Related Art

Electrochemical cells utilizing consumable metal anodes are well known. Such cells are described in detail in numerous patents and publications, including Rowley U.S. Pat. No. 3,791,871 (Feb. 12, 1974), Tsai et al U.S. Pat. No. 3,976,509 (Aug. 24, 1976), and Galbraith U.S. Pat. No. 4,528,248 (Jul. 9, 1985), the respective disclosures of which are incorporated herein by reference.

The cell disclosed in Rowley U.S. Pat. No. 3,791,871 typifies prior electrochemical cells utilizing a consumable metal anode which is highly reactive with water and spaced from a cathode by an electrically insulating film formed on the anode in the presence of water. The anode and cathode are in contact with an aqueous electrolyte during cell operation. In the cell of the Rowley patent, the anode comprises an elemental alkali metal such as sodium or lithium, and the electrolyte comprises an aqueous solution of the hydroxide of the anodic metal produced by the electrochemical reaction of the anodic metal with water.

The operation of such cells involves the following reactions which, for illustrative purposes, utilize lithium as the active material of the consumable metal anode, and aqueous lithium hydroxide as the electrolyte.

A. Anode Reaction
Electrochemical Dissolution $$Li \rightarrow Li^+_{(aq)} + e^- \quad (1)$$

Formation of Insulating Film on Anode $$Li^+_{(aq)} + OH^-_{(aq)} \rightarrow LiOH_{(aq)} \quad (2)$$

$$LiOH_{(aq)} \rightarrow LiOH_{(s)} \quad (3)$$

Parasitic Corrosion Reaction $$Li + H_2O \rightarrow LiOH_{(aq)} + \tfrac{1}{2}H_{2(g)} \quad (4)$$

B. Cathode Reaction
Reduction of Water $$H_2O + e^- \rightarrow OH^- + \tfrac{1}{2}H_{2(g)} \quad (5)$$

(aq) represents an ion dissolved in water and (s) represents a solid salt.

Reactions (1) and (5) are necessary for the generation of electricity. Reactions (2) and (3) serve to produce a porous insulating film which forms on the anode and protects it. Reaction (4) is a parasitic corrosion reaction which consumes the active anodic material and produces hydrogen gas but generates no useful current.

The anode of the Rowley patent is coated with a thin film of a nonreactive, partially water soluble material which is not electrically conductive. Preferably, the film is the natural hydrated oxide which forms on the metal surface as it is exposed to humid air. However, other suitable water soluble insulators may serve as the film. The film is porous and allows transport of aqueous electrolyte to the anode and transport of reaction products away from the anode.

The electrolyte of the cell disclosed in the Rowley patent is formed by the electrochemical reaction of water and the anodic metal. Thus, in the Rowley cell, water is introduced to the cell at a restricted rate and brought into direct contact with both the cathode and anode. The water dissolves a portion of the soluble film on the anode, resulting in the production of a hydrated hydroxide of the anode material, plus heat. As the reaction proceeds, useful electrical power is produced.

The anode and the cathode are not in direct contact with each other, but circuit connections are made at each of the cathode and anode for drawing electrical power from the cell.

The electrolyte is preferably a solution of the hydroxide of the anodic metal since such hydroxide is naturally formed during operation of the cell and hence automatically regenerates the electrolyte during operation.

The alkali metal of the Rowley anode is highly reactive with water. This reactivity decreases (at a given temperature) as the concentration of metal hydroxide in the electrolyte increases. Optimally (at typical operating temperatures), the concentration of lithium hydroxide in the electrolyte is maintained at about 4.2–4.5 molar. As the lithium hydroxide concentration in the cell rises, the rate of power generation from the cell correspondingly diminishes, and passivation of the anode can occur if the electrolyte becomes saturated with lithium hydroxide.

Thus, in these electrochemical cells, relatively high concentrations of the consumable metal hydroxide generally must be avoided to maintain a desired level of power output at typical operating temperatures. Therefore, steps must be taken to maintain the reactive metal hydroxide concentration in the electrolyte at a level at which useful electrical current is produced.

One solution to the problem of too great a concentration of the reactive metal hydroxide in the electrolyte is the continuous expulsion of a fraction of the electrolyte stream into the surrounding environment and the simultaneous injection of a similar flow rate of fresh water into the electrolyte. If the stream input and output are kept balanced and prorated by metal hydroxide production, this technique is effective. However, the technique has several disadvantages. Firstly, the motion of the inlet and outlet flow streams results in significant noise levels and in some applications the noise generated may exceed desired and/or tolerable noise limits. Secondly, the technique requires a continuous source of fresh feed water. For non-marine applications, there is no such ready source of inlet water and even if such inlet water were carried on board, its weight would in most cases, be prohibitive. Accordingly, all such closed loop electrochemical cells require some form of "electrolyte management", i.e., the removal of the reactive metal hydroxide from the circulated electrolyte.

The use of simple acids, such as phosphoric acid, hydrogen fluoride, etc., as electrolyte management agents for closed loop electrochemical cells, wherein the simple acid acts as a precipitant for the reactive metal hydroxide, generally suffers from the relatively great overhead weight burden imposed on the cell per gram of reactive metal hydroxide removed from the circulated electrolyte. Conventional precipitation techniques generally require large amounts of consumable reactants and result in the formation of large amounts of reaction products. The burden of carrying precipitating agents and the subsequently formed reaction products seriously reduce the specific energy and specific power of such power generation systems. Also, the extreme toxicity, volatility and dangerous propensities exhibited by some simple acids, such as hydrogen fluoride, make these materials unattractive as electrolyte management agents.

Electrolyte management may present a significant burden to reactive metal/aqueous electrolyte electrochemical cells.

SUMMARY OF THE INVENTION

It is an object of the invention to overcome one or more of the problems described above.

According to the invention, a method of power generation includes the step of supplying an electrolyte to an electrochemical reaction zone defined between a consumable metal anode and a cathode spaced from the anode of an electrochemical cell. The electrolyte comprises an aqueous solution of the hydroxide of the consumable metal and is circulated through the reaction zone to electrochemically generate electrical power and to form the hydroxide of the consumable metal. In turn, the hydroxide of the consumable metal is converted to water and at least one oxide of the consumable metal. The water is separated from the consumable metal oxide and is added to the electrolyte for continuous and efficient cell operation.

In addition, the invention comprehends corresponding systems of power generation.

Other objects and advantages will be apparent from those skilled in the art from the following detailed description taken in conjunction with the drawings and the appended claims.

DETAILED DESCRIPTION OF THE INVENTION

Figure 1:
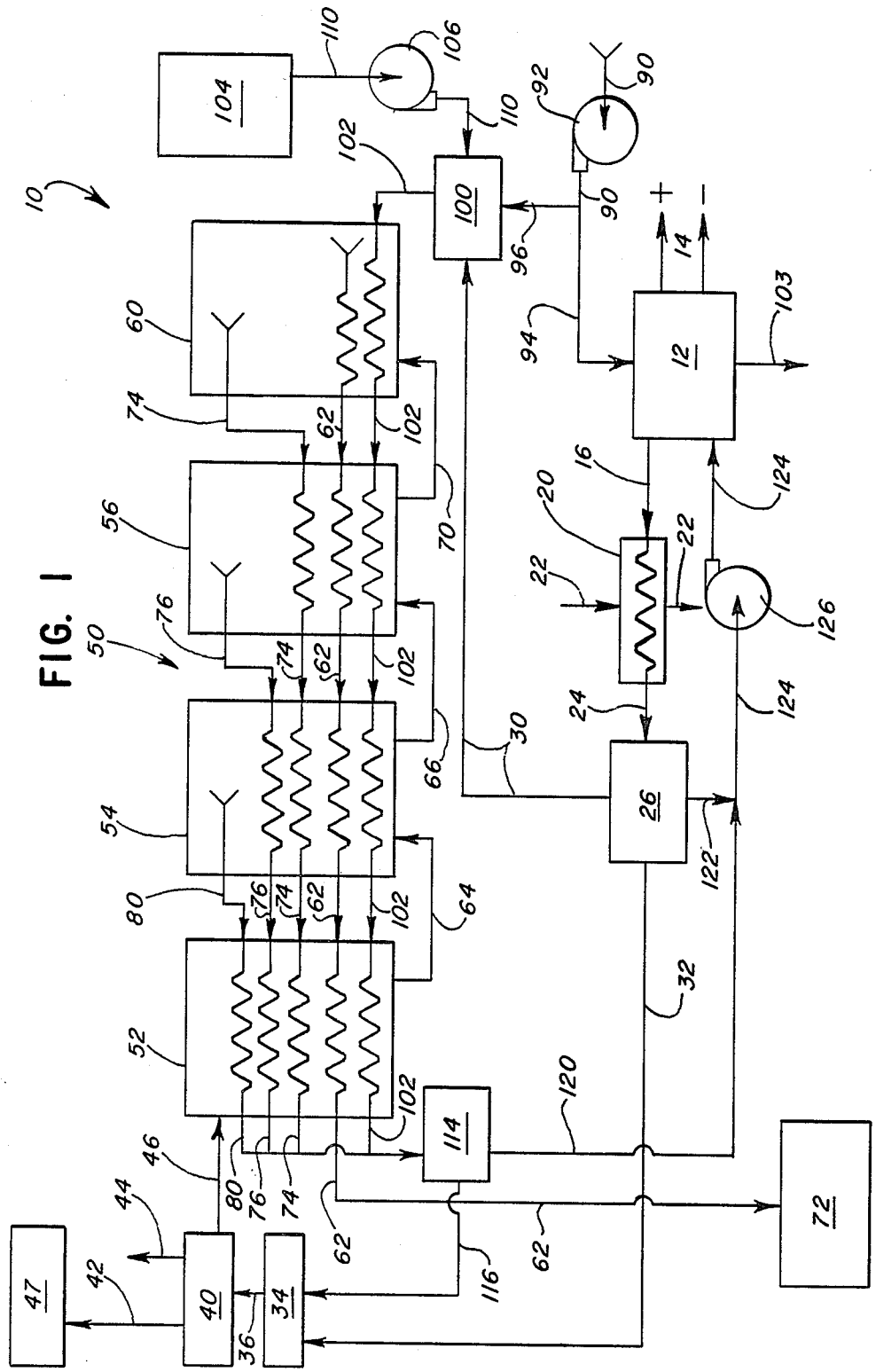
FIG. 1 is a schematic flow diagram of a system for power generation according to a typical embodiment of the present invention.

According to the invention, power generation systems and methods of power generation and electrolyte management in consumable metal/aqueous electrolyte electrochemical cells are provided.

The invention contemplates a system of power generation having an electrochemical cell with a consumable metal (e.g. lithium) anode. The present invention may be used with any configuration of cell which operates to produce the hydroxide of the anodic metal, which anodic metal hydroxide may be in aqueous, monohydrate, anhydrous, or other form. The cell typically has a consumable metal anode, a cathode spaced from the anode to define an electrochemical reaction zone therebetween and an electrolyte comprising an aqueous solution of the hydroxide of the consumable metal. It is to be understood that the electrolyte may additionally comprise common ion agents such as those containing hydroxide ion, as well as other organic or inorganic additives, such as those known in the art. Of course, each of the anode and the cathode will include a terminal or other circuit connector for drawing electrical power from the cell. Such circuit connectors are well known in the art.

Lithium is a preferred anodic material because of its high energy density. Other consumable metals, such as aluminum, magnesium, beryllium, calcium and other reactive metals, including other alkali metals, for example, may be used. The metal of the anode may be present in elemental, compound, alloy, amalgam or mixture form, as desired. Reference herein to the preferred lithium is exemplary only, and the invention is understood to encompass the use of other consumable metals.

The form of the anode is not critical, and any suitable configuration which is convenient for a desired application may be used.

It is to be understood that the invention is generally applicable to consumable metal/aqueous electrochemical cells regardless of the form of the cathode, provided that the hydroxide of the consumable metal is formed. For example, the invention may be practiced with cathodes in the form of oxygen or other gas consuming cathodes (e.g. air cathodes), metal oxides such as AgO, and/or with oxidizers such as $H_2O_2$, or simply $H_2O$. It is also to be understood that the invention may be practiced in conjunction with other systems of electrolyte management such as precipitation techniques.

In such electrochemical cells, an electrochemical reaction occurs at the anode, as is well-known, to produce a cation of the anodic metal and an electron, according to reaction (1), above, for example. The anodic cation reacts with the negatively charged ionic specie (typically hydroxide ion) in the electrolyte to form an anodic reaction product, typically lithium hydroxide (LiOH) in the case of a lithium anode, as in reaction (2), above.

As is well-known in the art, alkali metal anodes are coated with a water soluble, metal ion permeable insulating coating of the hydrated hydroxide of the anodic metal. This coating naturally forms on the anode upon exposure of the anode to humid air and is continuously regenerated during operation of the cell. Further, as described above, the coating acts to modulate the electrochemical reaction.

The metal hydroxide coating on the anode typically effects spacing between the anode and cathode, which may be in physical contact, but not in direct electrical contact, with each other. As is well-known in the art, however, other physical spacers, such as foam, screens, beads or combinations thereof, may be present.

Referring to FIG. 1, a power generation system 10, wherein combustion of hydrocarbon fuels is utilized, is shown. It is to be understood, however, that the invention may be practiced without the use of hydrocarbon fuels. The system 10 includes a cell stack 12 comprising a plurality of conductive metal anode/air cathode electrochemical cells. The cell stack 12 generates an electrical power output 14 which can be used for work. However, it is to be understood that the invention may be practiced with a single electrochemical cell, if desired.

An electrolyte flow stream 16, containing dissolved lithium hydroxide with hydrogen, gas dispersed therein is circulated from the cell stack 12 through a heat exchanger 20. The hydrogen gas forms as a by-product of the parasitic/corrosion reaction which occurs in each cell of the cell stack 12. The heat exchanger 20 removes heat from the stream 16 by indirectly contacting the stream 16 with a cooling stream 22 of air or water passing through the heat exchanger 20. The cooling of the stream 16 facilitates handling of the electrolyte. A cooled electrolyte flow stream 24 exits the heat exchanger 20 and is passed to an electrolyte reservoir/gas separator 26 wherein hydrogen gas, as well as other gases present in the electrolyte flow stream 24 and depicted as the flow stream 30 are vented. The use of hydrogen gas in the invention will be described in detail, below.

The resulting aqueous lithium hydroxide solution, depicted as a flow stream 32, is circulated from the reservoir/gas separator 26 to a reactor 34 wherein at least a portion of the lithium hydroxide reacts with carbon dioxide from the stream 116 to form a lithium carbonate transformation product, as follows:

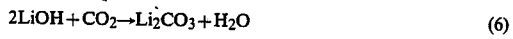

$$2LiOH + CO_2 \rightarrow Li_2CO_3 + H_2O \qquad (6)$$

The lithium carbonate product has only limited solubility in water, and its solubility decreases with increasing temperature, thus facilitating its separation and removal from the electrolyte. Furthermore, the lithium carbonate product is non-toxic.

A product stream 36 passes from the reactor 34 to a suitable separator 40 for the removal of solids, designated as a flow stream 42, including the carbonate reaction product, unreacted gases, designated as a flow stream 44 including, for example, nitrogen and oxygen, and aqueous lithium hydroxide, designated as a flow stream 46. The lithium carbonate product, i.e., product stream 42, can be discharged or placed in storage, depicted by a box 47, for later recovery of the lithium metal. The unreacted gases, i.e., flow stream 44, may be vented to the atmosphere. The aqueous lithium hydroxide stream 46 is fed to a series 50 of heat exchangers/reactors 52, 54, 56 and 60 wherein at least a portion of the lithium hydroxide is converted to lithium oxide, depicted as a flow stream 62.

In the illustrated embodiment, the heat exchanger/reactor 52 serves to heat the lithium hydroxide flowing therethrough. A flow stream 64 of heated lithium hydroxide exits from the heat exchanger/reactor 52 and is fed to a heat exchanger/reactor 54.

The heat exchanger/reactor 54 serves to remove water from the aqueous lithium hydroxide flowing therethrough. Thus, a monohydrate lithium hydroxide stream 66 exits therefrom.

The heat exchanger/reactor 56 serves to remove water from the monohydrate lithium hydroxide. Thus, a liquid lithium hydroxide stream 70 exits therefrom and is fed to the heat exchanger/reactor 60.

The heat exchanger/reactor 60 functions to convert the lithium hydroxide to lithium oxide and gaseous $H_2O$.

The solid lithium oxide and any unconverted lithium hydroxide, depicted as the flow stream 62, passes through the heat exchanger/reactors 56, 54 and 52 countercurrently to the aqueous lithium hydroxide feed stream 46 and the feed streams 64, 66 and 70 of the subsequent heat exchanger/reactors, e.g., 54, 56 and 60, respectively, whereby the stream 62 is cooled and the thermal energy therefrom is utilized in supplying at least a portion of the energy required in the heat exchanger/reactors. The lithium oxide and any unconverted lithium hydroxide in the stream 62 can be discharged or placed in storage (represented by a box 72) for later recovery of the lithium metal.

Water vapor, designated as a flow stream 74, generated in the heat exchanger/reactor 60 by way of the conversion of lithium hydroxide to lithium oxide, is passed countercurrently through the heat exchanger/reactors preceding the heat exchanger/reactor 60. Similarly, the water vapor generated in the heat exchanger/reactors 56 and 54 and designated as flow streams 76 and 80, respectively, is passed through the preceding heat exchanger/reactors. In this way, the thermal energy of the water vapor is utilized to supply at least a portion of the thermal energy required for the heating of the lithium hydroxide material.

Air, in a stream 90, is supplied to an air compressor/blower 92. Flow streams 94 and 96, respectively, indicate the capability of the air compressor/blower 92 to supply air to both the cell stack 12 and a burner 100. A flow stream 103 depicts the outflow of air from the cell stack 12.

Hydrogen gas, depicted as the flow stream 30, is transferred from the gas separator 26 and is fed as fuel to the burner 100. The exhaust of the burner 100, depicted as a flow stream 102, provides energy to drive the conversion of lithium hydroxide to lithium oxide and water. The exhaust stream 102 is passed countercurrently to the feed streams of the series 50 of heat exchanger/reactors, thereby providing thermal energy used in the conversion process.

It is to be understood that as an alternative embodiment of the invention, the lithium hydroxide, such as the monohydrate lithium hydroxide stream 66, may be injected directly into the burner 100, thereby simplifying the mechanics and operation of the system. A system utilizing direct injection of the hydroxide of the consumable metal into the burner will be described in greater detail herein in reference to FIG. 3.

Also, it is to be understood that the burning of the hydrogen gas, depicted as the stream 30, may not provide sufficient thermal energy to drive the reaction to the extent desired in which case the feed to the burner 100 may be supplemented with a hydrocarbon fuel.

In FIG. 1, hydrocarbon fuel (e.g., gasoline) is transferred from a storage tank 104 by means of a pump 106 through a stream 110 to the burner 100. In the burner 100 the fuel is burned and the carbon therein is oxidized to carbon dioxide (and some carbon monoxide), and hydrogen from the fuel is oxidized to water. The stream of gases 116, containing carbon dioxide from the exhaust of the burner 100, can be discharged or, as shown in FIG. 1, fed to the reactor 34 wherein the carbon dioxide reacts with aqueous lithium hydroxide.

The exhaust gas stream 102 is passed countercurrently through the series 50 of heat exchanger/reactors to provide thermal energy to drive the conversion process reaction.

Thereafter the stream of exhaust gases 102 as well as the products of the cooled water vapor streams 74, 76 and 80 are fed to a gas/liquid separator 114 wherein gases, depicted as a flow stream 116, are separated from water, depicted as a flow stream 120. The water stream 120 from separator 114 and the aqueous electrolyte, designated as a flow stream 122 from the reservoir/gas separator 26, form an electrolyte flow stream 124 which is circulated to the cell stack 12 by means of a pump 126.

The system 10 thus results in the recovery and return of water to the electrochemical cells wherein it is consumed as a reactant. Thus, the power generation systems of the invention reduce or eliminate the need to store water as a reactant.

In addition, the weight of the stored product is further reduced in that the stored product is generally in an oxide form, such as $Li_2O$, rather than in a hydroxide or an insoluble salt form such as that resulting from the use of conventional electrolyte management agents.

Previous lithium-air power generation systems utilize precipitating agents to control the concentration of lithium hydroxide in the electrolyte. For example, such systems using phosphoric acid as a precipitating agent typically have a specific energy of about 1270 Whr/kg of stored reactants (not including oxygen which is assumed to be available from the ambient air in all cases and, in this example, is not a stored reactant).

Advanced lithium-air power generation systems, such as that described in the patent application of Arnold Z. Gordon, U.S. Ser. No. 622,785 filed Jun. 21, 1984, which consume lithium and water can achieve specific energies of up to about 2900 Whr/kg of stored reactants.

The invention, as described in FIG. 1, consumes only lithium and operates in accordance with the following equations.

Electrochemical Reaction $$4Li + 2H_2O + O_2 \rightarrow 4LiOH \tag{7}$$

$\Delta G$ of reaction = $-76.58$ kcal/mole Li

Conversion Reaction $$2LiOH \rightarrow Li_2O + H_2O \tag{8}$$

$\Delta G$ of reaction = $-9.51$ kcal/mole Li
($\Delta G$ represents the Gibbs free energy of reaction.)

The theoretical (thermodynamic) specific energy of reactants is the sum of the $\Delta G$ values of equations (7) and (8) as shown in the overall system reaction.

Net Overall System Reaction $$4Li + O_2 \rightarrow 2Li_2O \tag{9}$$

$\Delta G$ of reaction = $(-76.58 + 9.51) = -67.07$ kcal/mole Li

This heat of reaction is equivalent to about 11,240 Whr/kg of stored reactants, i.e. lithium.

Allowing for losses inherent in the practical operation of all lithium-air cells (about 65% voltage efficiency and about 85% coulombic efficiency of lithium) the specific energy becomes (0.65) (0.85) (11,240 Whr/kg) = 6210 Whr/kg of reactants This specific energy is about 4.9 times greater than conventional lithium-air systems, about 2.1 times greater than lithium-air systems described in the above-identified Gordon application and about 1.5 times greater than advanced high efficiency hydrocarbon fuel burning thermal engines.

In the above-described system, the hydrogen gas produced by the corrosion reaction (4) is burned to provide thermal energy required to drive the conversion reaction (8) and thus further increase the overall system efficiency and specific energy. It has been calculated that, at 75% coulombic efficiency, for example, the heat available from hydrogen gas combustion provides about 75% of the heat required to convert all of the LiOH to $Li_2O$ and $H_2O$. The balance of the thermal energy can be supplied by the burning of hydrocarbon fuel.

If desired, as an alternative or in addition to the burning of hydrocarbon and/or hydrogen fuel, thermal energy may be supplied to the system by means of a resistance heater (not shown) powered by a portion of the electrical output of the cell.

Of course, the specific energy of consumable will be reduced if and when water is carried to compendate for deficiencies in the amount of water regenerated in the system. Alternatively, a hydrocarbon fuel can be used whereby water is recovered from the products of combustion with the heat of combustion used to permit the recovery of additional water from the anodic reaction product. In addition, as indicated above, the carbon dioxide produced as a result of the burning of a hydrocarbon fuel can also be used to augment water recovery by way of the above-identified reaction (6).

Figure 2:
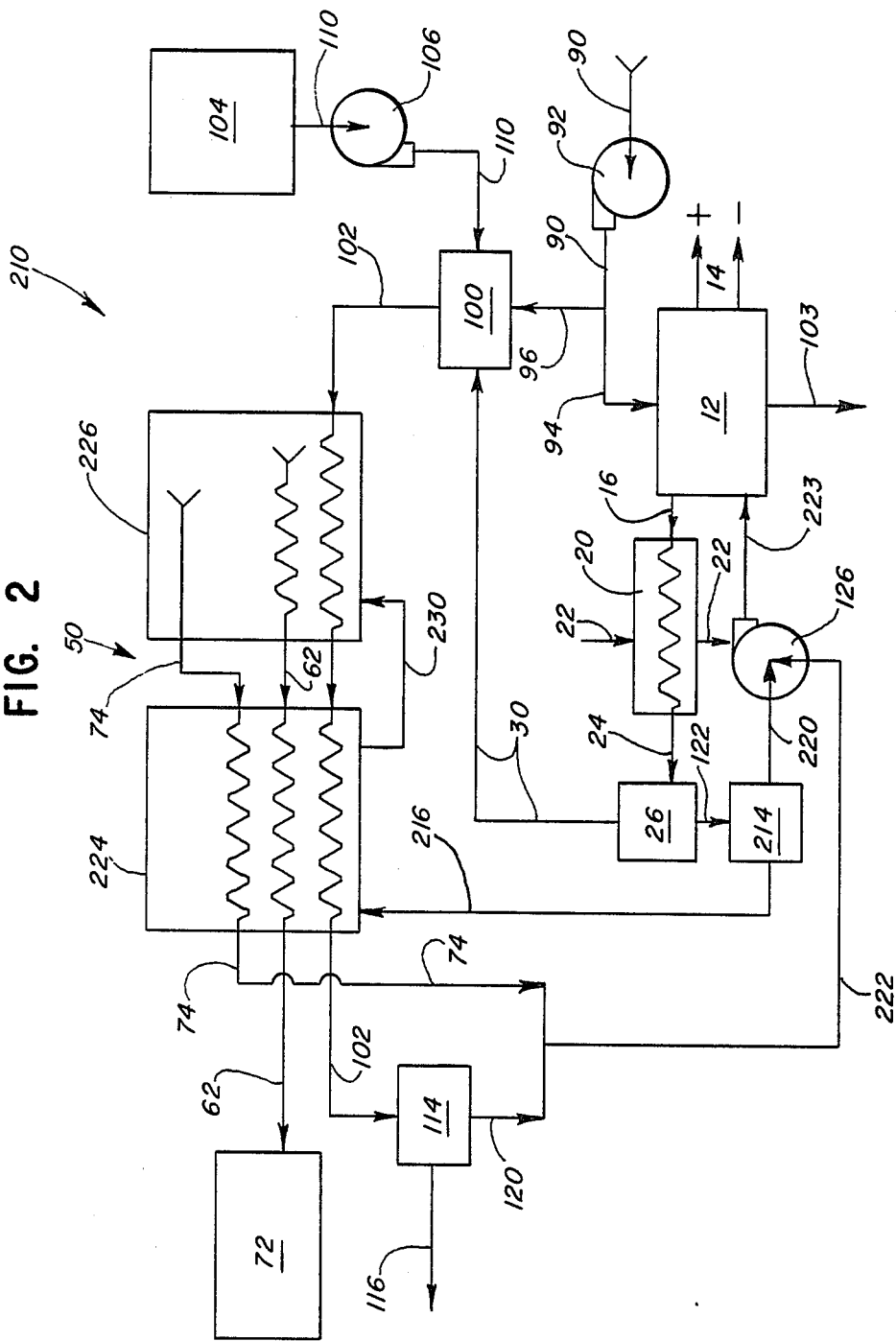
FIG. 2 is a schematic flow diagram of a system for power generation according to a preferred embodiment of the present invention.

Referring now to FIG. 2, a preferred embodiment of the present invention is shown. A system, generally designated 210, similar to the system 10 of FIG. 1 is shown. The system 210 includes components such as a cell stack 12, a heat exchanger 20, a gas separator 26, a burner 100, a lithium oxide/lithium hydroxide storage container 72, hydrocarbon fuel storage 104, etc.

The system 210 employs the same concept as that shown in FIG. 1 but now utilizing lithium/aqueous technology which results in the lithium/air battery reaction product being in the form of a solid. The patent application of Arnold Z. Gordon, U.S. Ser. No. 622,785 filed June 21, 1984, the disclosure of which is hereby incorporated herein by reference, discloses an electrochemical cell and method of generating electricity wherein solid electrochemical reaction product is produced.

The operation of consumable metal/aqueous electrochemical cells comprising a liquid electrolyte substantially saturated with respect to the product formed between the negatively charged electrolytic ionic specie and the anodic metal as a result of the electrochemical reaction thereof, results in the production of solid reaction product.

As is well known in the art, the reaction product formed between a positively charged anodic metal (which charging is the result of the reaction between the metal and water) and the electrolytic ionic specie produces an ionized salt dissolved in water. However, upon saturation, excess salt precipitates as a solid. Thus, in the case of a lithium anode, the electrolyte is saturated with respect to the water soluble reaction product of lithium in the ionic specie. If the ionic specie is hydroxide, the electrolyte must be saturated with respect to lithium hydroxide. Since the electrolyte is saturated, it will contain at least small amounts of solid reaction product such as solid lithium hydroxide. As the cell is used, additional anode reaction product will, of course, form and precipitate.

Furthermore, the electrolyte may include a substance which provides a common ion effect with respect to the anode reaction product to assist in the attainment of saturation at lower anodic metal ion concentrations. The use of a common ion material also improves conductivity of the electrolyte and, if used above certain concentrations, tends to provide anhydrous anode reaction product which in turn lowers the weight of the system.

For example, if the anode is lithium and the negatively charged ionic specie of the electrolyte is hydroxide, the anode reaction product is lithium hydroxide (LiOH). The saturation concentration of lithium hydroxide in distilled water is about 5.3M, and this concentration is relatively independent of temperature. However, this concentration is not independent of the concentration of other materials in the electrolyte, and the saturation concentration decreases as the concentration of other materials rises.

Thus, the electrolyte may be provided with such common ion materials such as potassium hydroxide (KOH) or sodium hydroxide (NaOH) to shift the saturation concentration of lithium downward. This in turn renders the electrolyte much more sensitive to the addition of lithium ions to the solution and thus is very helpful in maintaining saturation of the electrolyte.

The operation of such cells, at or near saturation, is in effect, self-regulating in that if the concentration of the anode reaction product of the electrolyte falls below saturation, saturation will rapidly be restored due to the reaction of the electrolyte with the anode without adverse thermal effects.

Furthermore, it has been found that if a saturated electrolyte is provided, a reactive metal/aqueous electrochemical cell can stably and safely be operated at temperatures well in excess of prior practical maximum operating temperatures. Also, the power characteristics of such cells are readily controllable and are directly related to the temperature of operation. More specifically, it has been found that power characteristics (i.e., current density, etc.) are directly and exponentially related to the temperature of the electrolyte, and that the temperature is the only variable which need be considered.

The passivation of the anode upon electrolyte saturation allows such electrochemical cells to safely and stably produce electrical power. This is especially important in view of the fact that operation at moderate temperatures with a non-saturated electrolyte without effective electrolyte management invariably results in thermal runaway and explosion of the cell.

This technology permits the operation of the electrochemical cells at elevated temperatures. The maximum useful temperature of operation appears to be limited only by the boiling point of the electrolyte at the pressure of operation. Thus, since aqueous electrolytes containing common ion additives and other additives can have atmospheric boiling points well in excess of 100° C., it is readily possible to operate the cell at temperatures in the range of about 90° C. to at least 150° C. at atmospheric pressure using a lithium anode. If the cell is pressurized, even higher temperatures are obtainable.

The desired operating temperature can be obtained by any of various means. The cell is self-heating at even low temperatures because the anode electrochemical reaction proceeds to some extent and creates heat as it does so. Thus, in practice, the electrolyte need only be added to the cell and the reaction allowed to proceed (at electrolyte saturation, for safety) with appropriate heat exchange means for maintenance of the cell temperature when the desired temperature is reached.

In addition, since the electrolyte is saturated, the cell can operate at extremely low or nonexistent electrolyte flow rates. Generally, however, some minimal electrolyte flow rate is desired in order to maintain circulation of solid precipitants present in the electrolyte. Such saturated electrochemical systems are indifferent to pressure of operation, electrolyte flow rate, and all other variables other than temperature as long as saturation of the electrolyte is maintained.

Referring again to FIG. 2. the use of carbon dioxide to form lithium carbonate is not shown but it is to be understood that such technology may be applied if the reaction will proceed with solid lithium hydroxide in the saturated electrolyte.

The gas separator 26 separates the gases from the electrolyte flow stream 24 with the resulting electrolyte, depicted as a flow stream 122, transferred to a lithium hydroxide separator 214 wherein solid lithium hydroxide is removed from the electrolyte. Solid lithium hydroxide, depicted as a flow stream 216, is fed to the series of heat exchanger/reactors 50 while the liquid electrolyte, depicted as a flow stream 220, has water added thereto, depicted as a flow stream 222. The flow stream 222 is formed by the condensation of water vapor of the flow stream 74 and the water flow stream 120 from the gas/liquid separator 114. The resulting aqueous electrolyte mixture, depicted as a flow stream 223, is transferred via an electrolyte pump 126 to the cell stack 12.

The series 50 of heat exchanger/reactors is illustrated as comprising two heat exchangers/reactors 224 and 226, respectively. The heat exchanger/reactor 224 serves to heat and thereby liquify the lithium hydroxide. Liquid lithium hydroxide, depicted as a flow stream 230, is transferred from the heat exchanger/reactor 224 to the heat exchanger/reactor 226 wherein the lithium hydroxide is converted to lithium oxide and water.

Figure 3:
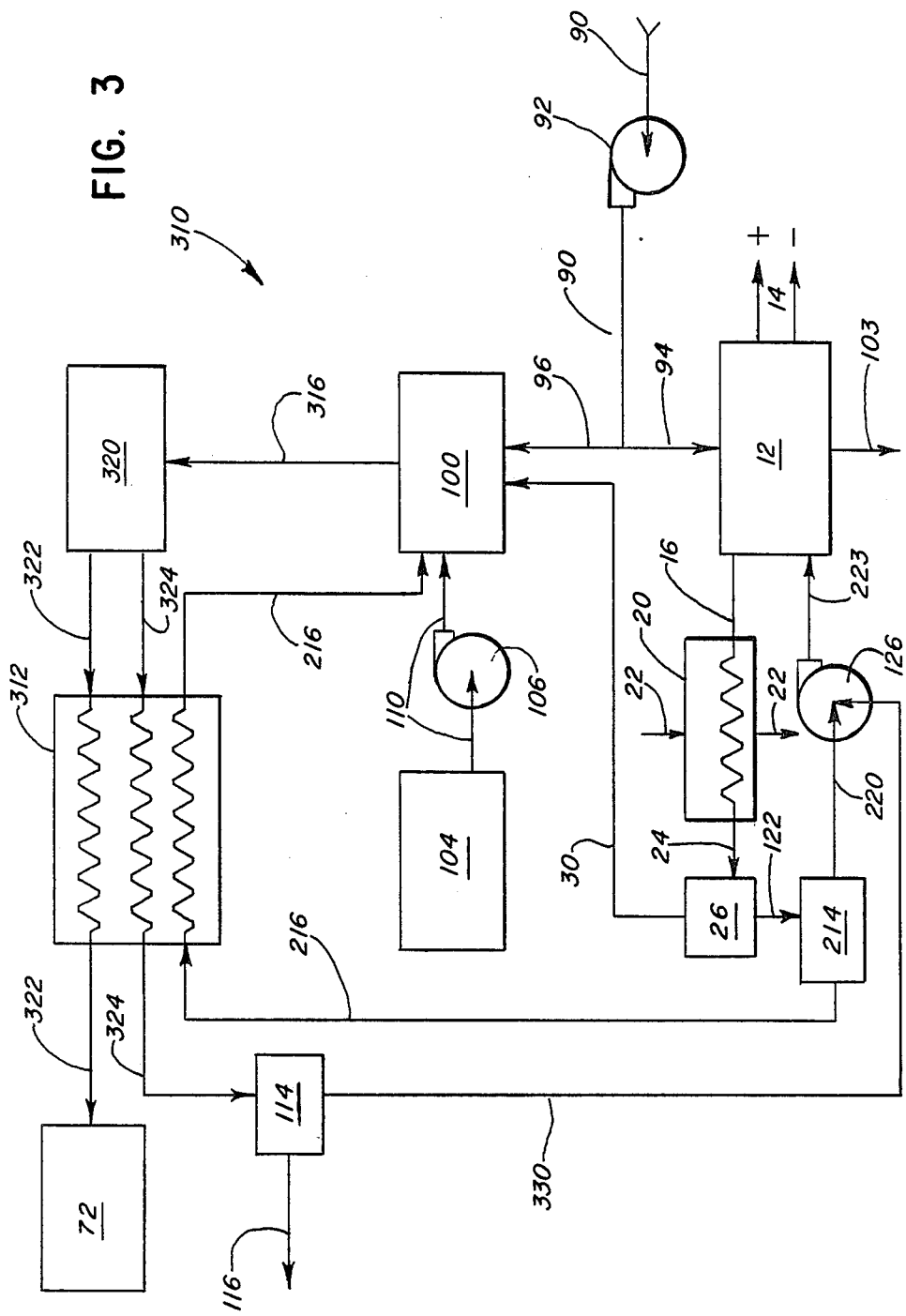
FIG. 3 is a schematic flow diagram of a system for power generation according to an alternative embodiment of the present invention.

Referring now to FIG. 3, an alternative embodiment of the present invention is shown. A system, generally designated 310, similar to the system 210 of FIG. 2 is shown. The system 310 employs the concept of adding lithium hydroxide, either in solid or aqueous form directly into the burner to react with the combustion products. The system 310 includes components such as a cell stack 12, a heat exchanger 20, a gas separator 26, a burner 100, a water separator 114, hydrocarbon fuel storage 104, fuel pump 106, etc.

The system 310 utilizes the combustion of hydrocarbon fuels in the process of converting the hydroxide of the consumable metal to at least one oxide of the consumable metal and water. However, specific power generation systems may make the use of hydrocarbon fuels unattractive and/or unnecessary. Thus, it is to be understood that the use of hydrocarbon fuels is not essential to the practice of the invention and that the invention may be practiced without their use.

In the system 310, solid lithium hydroxide, depicted as a flow stream 216 is transferred to a heat exchanger 312 wherein the solid lithium hydroxide is heated and/or liquified and subsequently transferred to the burner 100 wherein the lithium hydroxide reacts with the heat and the combustion products of the hydrocarbon and hydrogen combustion. The burner products, depicted as a flow stream 316, are transferred to a solid particle separator 320 wherein solids, depicted as a flow stream 322, are separated from gaseous combustion products, depicted as a flow stream 324. The solid flow stream 322 which comprises lithium oxide, lithium hydroxide and, optionally, lithium carbonate, is passed through the heat exchanger 312 countercurrently to the solid lithium hydroxide stream 216, providing thermal energy content for the heating thereof and is discharged or transferred to a storage container 72.

The gaseous products stream 324, which comprises $N_2$, $O_2$ and, optionally, $CO_2$ and/or CO, is cooled by flow through the heat exchanger 312 forming water with gases dispersed therein and is transferred to a gas/water separator 114 wherein the gases are separated from the water. The water collected by the gas/water separator 114, designated as a flow stream 330, is added to the electrolyte flow stream 220 to form an electrolyte flow stream 223 which is pumped by the electrolyte pump 126 to the cell stack 12.

Figure 4:
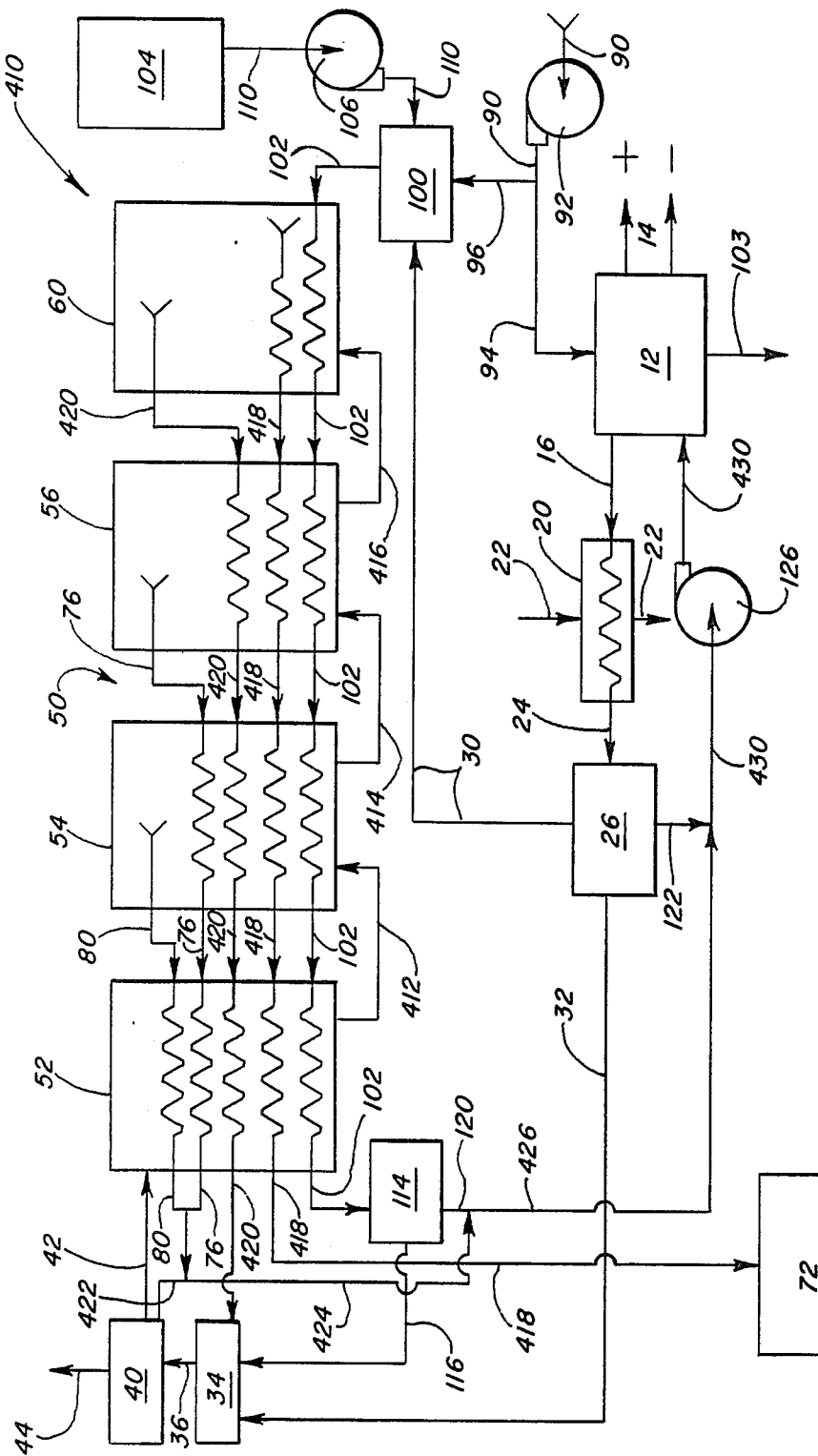
FIG. 4 is a schematic flow diagram of a system for power generation according to another alternative embodiment of the present invention.

Now referring to FIG. 4, an alternative embodiment of the present invention, wherein lithium hydroxide is transformed to lithium carbonate which in turn is reacted to yield a lithium oxide and carbon dioxide, is shown. A system, generally designated 410, similar to the system 10 of FIG. 1 is shown. The system 410 includes components such as a cell stack 12, a heat exchanger 20, a gas separator 26, a burner 100, a water separator 114, etc. In addition, the system 410 includes hydrocarbon fuel storage 104 and a fuel pump 106. It is to be understood, however, that the use of hydrocarbon fuel is optional and that the invention may be practiced without the use thereof.

In the system 410, the solid flow stream 42, comprising lithium carbonate ($Li_2CO_3$) with minor portions of water and lithium hydroxide entrained therewith, is fed directly to the series 50 of heat exchanger/reactors 52, 54, 56 and 60.

In the illustrated embodiment, the heat exchanger/reactor 52 serves to heat the lithium carbonate slurry flowing therethrough. A flow stream 412 of heated lithium carbonate slurry exits from the heat exchanger/reactor 52 and is fed to heat exchanger/reactor 54.

The heat exchanger/reactor 54 serves to remove water from the lithium carbonate slurry flowing therethrough and thus, a dry lithium carbonate stream 414 exits therefrom.

The heat exchanger/reactor 56 serves to liquify the lithium carbonate. Thus, a liquid lithium carbonate stream 416 exits therefrom and is fed to the heat exchanger/reactor 60.

The heat exchanger/reactor 60 functions to convert the lithium carbonate to lithium oxide and gaseous carbon dioxide. It is to be understood, however, that under practical conditions, minor proportions of lithium hydroxide and/or carbon monoxide will also be formed in the heat exchanger/reactor 60.

The solid lithium oxide and any unconverted lithium carbonate, depicted as a flow stream 418, passes through the heat exchanger/reactors 56, 54 and 52 countercurrently to the lithium carbonate feed stream 42 and the feed streams 412, 414 and 416 of the subsequent heat exchanger/reactors, e.g., 54, 56 and 60, respectively. In this fashion the stream 418 is cooled and the thermal energy therefrom is utilized in supplying at least a portion of the energy required in the heat exchanger/reactors. The lithium oxide and any unconverted lithium carbonate 418 can be discharged or placed in storage represented by a box 72 for later recovery of the lithium metal.

The gaseous product generated in the heat exchanger/reactor 60 comprises primarily carbon dioxide and is designated as a flow stream 420. The flow stream 420 is passed countercurrently through the heat exchanger/reactors preceding the heat exchanger/reactor 60 so that at least a portion of the thermal energy thereof is utilized to supply at least a portion of the thermal energy required for the heating of the lithium carbonate material. The flow stream 420 is then fed to the reactor 34 wherein at least a portion of the carbon dioxide reacts with lithium hydroxide to form the transformation product shown in equation (6) above.

The water product from the separator 40, designated as a flow stream 422, as well as the water vapor flow streams 76 and 80, form a water flow stream designated 424 which is combined with the water flow stream 120 resulting from the gas/liquid separator 114. The combined water flow, designated as a flow stream 426, is combined with the aqueous electrolyte flow stream 122 so as to form an electrolyte flow stream 430 which is circulated to the cell stack 12 by means of a pump 126.

It is to be understood that compounds other than or in addition to carbon dioxide may react with the hydroxide of the consumable metal and form transformation products which permit the recovery of the active materials thereof. Examples of these compounds include aluminates of hydroxides, borates of hydroxides, oxalates of hydroxides, arsenates of hydroxides, laurates, palmates and stearates.

The foregoing detailed description is given for clearness of understanding only, and no unnecessary limitations should be understood therefrom, as modifications within the scope of the invention will be obvious to those skilled in the art. For example, catalysts may be added or contacted with the hydroxide of the consumable anodic metal so as to increase the oxide conversion rate and/or reduce the activation energy of the hydroxide to the oxide and water. Also various discrete components (e.g., heat exchangers, separators, etc.) may be integrated into single units to reduce weight and increase efficiency. Additionally, the various heat exchangers, reactors, etc. may be operated at greater or lower than atmosphere pressure in order to increase the rate of reaction or improve the efficiency of the system.

I claim:

1. A system for power generation, comprising:
   an electrochemical cell including a consumable metal anode, a cathode spaced from said anode to define an electrochemical reaction zone, and an electrolyte comprising an aqueous solution of the hydroxide of said consumable metal;
   means for circulating said electrolyte through said reaction zone to electrochemically generate electrical power and form the hydroxide of said consumable metal;
   means for converting at least a portion of said hydroxide of said consumable metal to water and at least one oxide of said consumable metal;
   means for separating said consumable metal oxide from said water; and
   means for adding said water to said electrolyte.

2. The system of claim 1 wherein said consumable metal comprises a reactive metal.

3. The system of claim 2 wherein said reactive metal comprises an alkali metal.

4. The system of claim 3 wherein said alkali metal comprises lithium.

5. The system of claim 4 wherein said oxide comprises $Li_2O$.

6. The system of claim 1 wherein said cathode comprises a material selected from the group consisting of conductive metals and metal oxides.

7. The system of claim 6 wherein said cathode metal oxide comprises AgO.

8. The system of claim 1 wherein said cathode is an oxygen-consuming cathode.

9. The system of claim 8 wherein said cathode is an air cathode.

10. The system of claim 1 wherein said electrochemical celladditionally comprises a cathode reactant selected from the group consisting of $O_2$, AgO, $H_2O_2$ and $H_2O$.

11. The system of claim 1 wherein said hydroxide is selected from the group consisting of anhydrous hydroxide, monohydrate hydroxide, aqueous hydroxide and mixtures thereof.

12. The system of claim 1 wherein said converting means comprises:
means for reacting at least a portion of said hydroxide with a reactant to yield a transformation product and water; and
means for reacting said transformation product to yield said consumable metal oxide and said reactant.

13. The system of claim 12 wherein said reactant is carbon dioxide and said transformation product comprises a carbonate of said consumable metal.

14. The system of claim 12 wherein said converting means includes means for providing thermal energy to said reacting means to drive said reaction.

15. The system of claim 14 wherein said energy providing means comprises a burner adapted for the burning of fuel with an oxygen containing gas to generate thermal energy.

16. The system of claim 15 wherein said hydroxide of said consumable metal is fed directly to said burner.

17. The system of claim 15 wherein said fuel is selected from the group consisting of hydrogen gas, hydrocarbons and mixtures thereof.

18. The system of claim 14 wherein said energy providing means comprises a thermal engine adapted to generate useful power.

19. The system of claim 18 additionally comprising means adapted for contacting exhaust from said thermal engine with said hydroxide to form a reaction product and water;
means for separating said reaction product from said water; and
means for recirculating said water to said reaction zone.

20. The system of claim 19 wherein said reaction product comprises a carbonate of said consumable metal.

21. The system of claim 14 wherein said energy providing means comprises an electrical resistance heater.

22. The system of claim 21 wherein said resistance heater is powered by a portion of the electrical power generated by said cell.

23. A method of power generation comprising the steps of:
supplying an electrolyte to an electrochemical reaction zone defined between a consumable metal anode and a cathode spaced from said anode of an electrochemical cell, said electrolyte comprising an aqueous solution of the hydroxide of said consumable metal;
circulating said electrolyte through said reaction zone to electrochemically generate electrical power and form the hydroxide of said consumable metal;
converting at least a portion of said hydroxide of said consumable metal to water and at least one oxide of said consumable metal;
separating said consumable metal oxide from said water; and
adding said water to said electrolyte.

24. The method of claim 23 wherein said consumable metal comprises a reactive metal.

25. The method of claim 24 wherein said reactive metal comprises an alkali metal.

26. The method of claim 25 wherein an alkali metal comprises lithium.

27. The method of claim 26 wherein said oxide comprises $Li_2O$.

28. The method of claim 23 wherein said cathode comprises a material selected from the group consisting of conductive metals and metal oxides.

29. The method of claim 28 wherein said cathode metal oxide comprises AgO.

30. The method of claim 23 wherein said cathode is an oxygen-consuming cathode.

31. The method of claim 30 wherein said cathode is an air cathode.

32. The method of claim 23 wherein said electrochemical cell additionally comprises a cathode reactant selected from the group consisting of $O_2$, AgO, $H_2O_2$ and $H_2O$.

33. The method of claim 23 wherein said hydroxide is selected from the group consisting of anhydrous hydroxide, monohydrate hydroxide, aqueous hydroxide and mixtures thereof.

34. The method of claim 23 wherein said converting step comprises the steps of;
reacting at least a portion of said hydroxide and a reactant to yield a transformation product and water; and
reacting said transformation product to yield said consumable metal oxide and said reactant.

35. The method of claim 34 wherein said reactant is carbon dioxide and said transformation product comprises a carbonate of said consumable metal.

36. The method of claim 34 wherein said converting step include the step of providing thermal energy to said reacting means to drive said reaction.

37. The method of claim 36 wherein said energy providing step comprises burning of fuel with an oxygen containing gas in a burner to generate thermal energy.

38. The method of claim 37 wherein said hydroxide of said consumable metal is fed directly to said burner.

39. The method of claim 37 wherein said fuel is selected from the group consisting of hydrogen gas, hydrocarbons and mixtures thereof.

40. The method of claim 36 wherein said energy providing step comprises the step of operating a thermal engine adapted to generate useful power.

41. The method of claim 40 additionally comprising the steps of:
contacting exhaust from said thermal engine with said hydroxide to form a reaction product and water;
separating said reaction product from said water; and
recirculating said water to said reaction zone.

42. The method of claim 41 wherein said reaction product comprises a carbonate of said consumable metal.

43. The method of claim 36 wherein said energy providing means comprises an electrical resistance heater.

44. The method of claim 43 wherein said resistance heater is powered by a portion of the electrical power generated by said cell.

* * * * *